Sept. 22, 1925.  A. T. POTTER  1,554,292
WINDSHIELD PIVOT
Filed Feb. 4 1924  2 Sheets-Sheet 1
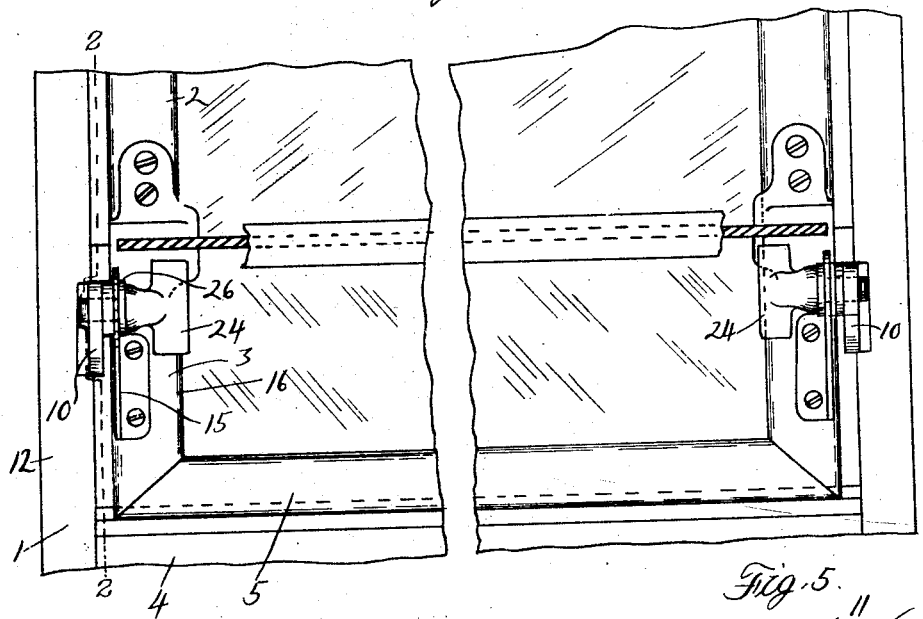
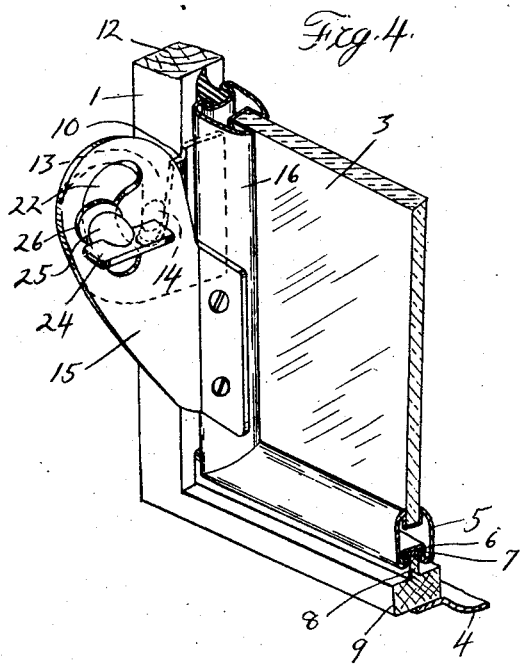
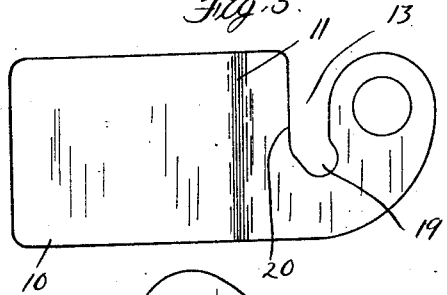
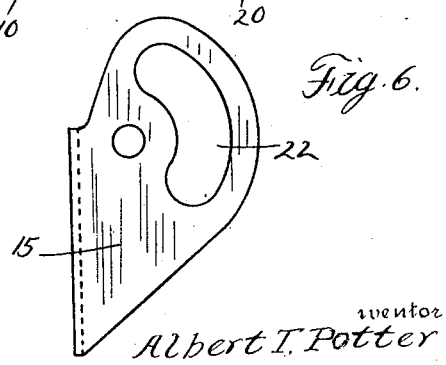
Inventor
Albert T. Potter
By Whittemore Hulbert Whittemore
& Belknap  Attorneys Sept. 22, 1925.
A. T. POTTER
WINDSHIELD PIVOT
Filed Feb. 4, 1924
1,554,292
2 Sheets-Sheet 2
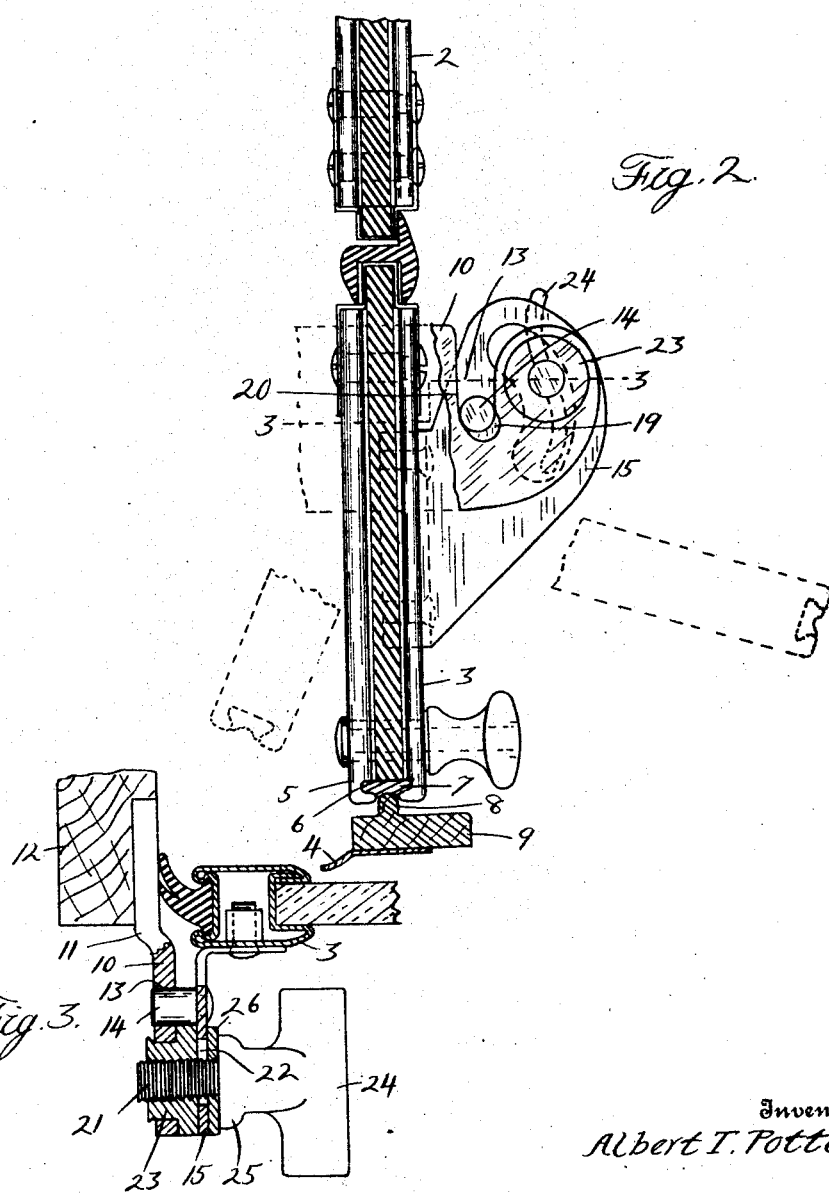
Inventor
Albert T. Potter
By Whittemore Hulbert Whittemore
 & Belknap   Attorneys Patented Sept. 22, 1925.

1,554,292

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

WINDSHIELD PIVOT.

Application filed February 4, 1924. Serial No. 690,618.

*To all whom it may concern:*

Be it known that I, ALBERT T. POTTER, a citizen of the United States of America, residing at Detroit, in the county of Wayne and State of Michigan, have invented certain new and useful Improvements in Windshield Pivots, of which the following is a specification, reference being had therein to the accompanying drawings.

This invention relates generally to pivot constructions and consists of certain novel features of construction, combinations, and arrangements of parts as will be more fully described and particularly pointed out in the appended claims.

In the accompanying drawings:

Figure 1 is a front elevation of a windshied mounted in a frame upon the dash board of a vehicle body;

Figure 2 is a sectional view taken on line 2—2 of Figure 1 and showing in dotted lines the upper and lower windshild sections in adjusted position;

Figure 3 is a sectional view taken on line 3—3 of Figure 2;

Figure 4 is a fragmentary perspective view;

Figure 5 is a detail view of one of the brackets;

Figure 6 is a detail view of the other bracket.

In these views, the numeral 1 designates a frame surrounding a pair of windshield sections 2 and 3 respectively and mounted upon the dash board 4 of a vehicle body. In order that a weather tight fit may be obtained when the lower section is closed, the lower rail 5 of the section is provided with a channel 6 in which a channel-shaped resilient strip 7 is secured for receiving a suitable weather strip or fence 8 upon the base or lower bar 9 of the frame 1.

For mounting the lower section 3 of the windshield upon the frame, I preferably provide a pair of horizontally arranged brackets 10 having offset portions 11 secured to the inner sides of the frame standards 12 and having vertical open ended slots 13 at their upper edges for receiving a pair of pivot pins 14 projecting laterally from upwardly inclined bracket arms 15 secured to the end rails 16 of the lower windshield section. Each slot 13 is preferably offset inwardly at its lower end as shown at 19 for receiving the pivot pins 14 when the section 3 is disengaged from the fence 8 and is provided with a straight bearing edge 20 against which the pivot pins 14 may be moved when the section 3 is raised or lowered with respect to the fence.

In order that the section 3 may be held in adjusted position, I preferably provide a pair of screws 21 which extend freely through arcuate shaped slots 22 in the bracket arms 15 and threadedly engage bearings 23 that extend through the brackets 10 and are riveted thereto. Winged nuts 24 are formed integral with the screws 21 at one end thereof and are provided with annular shoulders 25 which are adapted to engage metallic washers 26 surrounding the screws and engaging the brackets 15. Very slight rotation of the winged nuts 24 is required for clamping the washers 26 and bearings 23 together to hold the lower section 3 in adjusted position. The slots 22 are preferably concentric with the pivot pin 14 and are of sufficient width throughout their length to permit the screws 21 to be moved vertically when the lower section 3 is raised or lowered and also to permit the screws 21 to be moved in an arc when the lower section 3 is swung either inwardly or outwardly with respect to the fence 8.

In use, the upper section 2 of the windshield is first swung upon its pivots to permit the lower section 3 to be raised to clear the fence 8. The lower section 3 is then raised to clear the fence 8, the upward movement of the section being guided by the straight edges 20 of the slots 19 and being limited by the lower ends of the slots 22. After the section 3 has been raised it is swung into the desired direction over the fence and is then allowed to drop so that the pivot pins 14 engage the offset lower ends 19 of the slots 13. The section 3 is then swung to the desired open position, the ends of the slots 22 forming stops for the pivot screws 21 and thus limiting the swinging movement of the section 3 in opposite directions. One or both of the winged nuts 24 may then be adjusted to clamp the section 3 in open position.

From the foregoing description it will be readily apparent that I have provided a simple construction which will permit the lower windshield section to be raised or lowered or swung forwardly or rearwardly with respect to a suitable base weather strip or fence.

It will also be apparent that the clamping means for holding the section in adjusted position is entirely independent of the pivot elements and cooperates with the ends of the slots in the windshield brackets for limiting the vertical and swinging movements of the lower windshield section. Moreover, the mountings may be readily taken apart by merely removing the screws 21 from the bearings 23 consequently the repairs and replacements may be easily and quickly made whenever desired.

What I claim as my invention is:—

1. In a pivot construction, the combination with a stationary member, a fence carried thereby and a movable member normally engaging the fence, of a bracket secured to the stationary member having a slot therein, a bracket secured to the movable member, a pivot element carried by the last-mentioned bracket and extending through the slot aforesaid, said slot being of sufficient length to permit the pivot element to be moved therein so that the movable member may be disengaged from the fence, the last-mentioned bracket having a slot therein, and an adjustable clamping member carried by the first-mentioned bracket and extending through the last-mentioned slot, the last-mentioned slot being curved to permit the adjustable member to be moved therein when said movable member is swung on said pivot.

2. In a pivot construction, the combination with a stationary member, a fence carried thereby and a movable member normally engaging the fence, of a bracket secured to the stationary member having a slot therein, a bracket secured to the movable member, a pivot element carried by the last-mentioned bracket and extending through the slot aforesaid, said slot being of sufficient length to permit the pivot element to be moved therein so that the movable member may be disengaged from the fence, a bearing carried by the first-mentioned bracket, the last-mentioned bracket having a slot therein, and a member movable in the last-mentioned slot and engageable with said bearing to clamp said brackets and bearing together for holding said movable member in adjusted position.

3. In a pivot construction, the combination with a stationary member, a fence carried thereby, and a movable member, of a bracket secured to the stationary member and having a slot therein, a bracket secured to the movable member and having a slot therein, a pivot element carried by the last-mentioned bracket extending through the first-mentioned slot, the first-mentioned slot permitting said pivot to be moved therein whereby said movable member may be disengaged from said fence, and a clamping member carried by the first-mentioned bracket and extending through the last-mentioned slot, the last mentioned slot being curved to permit said clamping member to be moved therein when said movable member is swung on its pivot and being of a predetermined length whereby the swinging movement of said movable member is limited.

4. In a pivot construction, the combination with a supporting frame, of a closure member mounted for both vertical and swinging movement in said frame, and means for mounting the closure member including brackets secured to said members, one bracket having a slot therein, a pivot carried by the other bracket movable longitudinally of said slot, a bearing carried by one bracket having a threaded opening, and means extending through the other bracket having a threaded portion engageable in the opening of said bearing for holding said closure member in adjusted position.

5. In a pivot construction, the combination with a stationary frame member, of a closure member mounted for vertical and swinging movement relative to said frame member, of means for mounting said closure member including a pair of brackets secured to said members having slots therein, a pivot element carried by one of said brackets adjustable longitudinally of the slot in the other of said brackets, a bearing carried by one of the brackets aforesaid, and an adjustable member carried by the other bracket movable longitudinally of the slot in the bracket and carrying the bearing and engageable with the bearing for holding the closure member in adjusted position.

6. In a pivot construction, the combination with a frame, and a fence carried thereby, of a closure member mounted for vertical and swinging movement with respect to said fence, and means for mounting the closure member on the frame including a bracket secured to the frame having a slot therein, a bracket secured to the closure member, a pivot element carried by the last mentioned bracket extending through the slot aforesaid, said slot being of sufficient length to permit the pivot element to be moved therein so that the closure member may be disengaged from the fence, and means independent of the pivot element for holding the closure member in adjusted position.

In testimony whereof I affix my signature.

ALBERT T. POTTER.